(12) United States Patent
Santos et al.

(10) Patent No.: US 7,275,183 B2
(45) Date of Patent: Sep. 25, 2007

(54) METHOD OF RESTORING PROCESSES WITHIN PROCESS DOMAIN

(75) Inventors: Jose Renato Santos, San Jose, CA (US); Dinesh Kumar Subhraveti, Los Angeles, CA (US); Yoshio Frank Turner, Redwood City, CA (US); Gopalakrishnan Janakiraman, Sunnyvale, CA (US); David E. Lowell, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 10/836,538

(22) Filed: Apr. 30, 2004

(65) Prior Publication Data

US 2005/0257090 A1 Nov. 17, 2005

(51) Int. Cl.
*G06F 11/00* (2006.01)
(52) U.S. Cl. ............... 714/35; 714/13; 714/15; 714/38; 714/49
(58) Field of Classification Search ............... 714/13, 714/15, 35, 38, 49
See application file for complete search history.

(56) References Cited

U.S. PATENT DOCUMENTS

| 6,338,147 | B1 | 1/2002 | Meth et al. | |
| 6,594,779 | B1* | 7/2003 | Chandra et al. | 714/15 |
| 7,117,354 | B1* | 10/2006 | Browning et al. | 713/100 |
| 2002/0087916 | A1 | 7/2002 | Meth | |

OTHER PUBLICATIONS

Bouteiller, A., et al., Coordinated checkpoint versus message log for fault tolerant MPI, Dec. 2003.
Duell, J., The Design and Implementation of Berkeley Lab's Linux Checkpoint/Restart, 2003.
Litzkow, M., et al., Checkpoint and Migration of UNIX Processes in the Condor Distributed Processing System, 1997.
Osman, S., et al., The Design and Implementation of Zap: A System for Migrating Computing Environments, Proc. OSDI 2002, Dec. 2002.
Plank, J.S., et al., Libckpt: Transparent Checkpointing under Unix, < http://www.cs.utk.edu/plank/plank/papers/USENIX-95W.html> , 1995.
Plank, J.S., An Overview of Checkpointing in Uniprocessor and Distributed Systems, Focusing on Implementation and Performance, Tech. Report UT-CS-97-372, Univ. of Tenn., Knoxville, Tenn., Jul. 1997.
Stellner, G., CoCheck: Checkpointing and Process Migration for MPI, 1996.
Youhui, Z., et al., Checkpointing and Migration of parallel processes based on Message Passing Interface, Oct. 2002.
Zhong, H., et al., CRAK: Linux Checkpoint/Restart As a Kernel Module, Technical Report CUCS-014-01, < http://www.ncl.cs.columbia/research/migrate/crak.html> , Nov. 2001.

* cited by examiner

*Primary Examiner*—Robert Beausoliel
*Assistant Examiner*—Charles Ehne
(74) *Attorney, Agent, or Firm*—Richard P. Lange

(57) ABSTRACT

A method of restoring processes within a process domain begins with a step of restoring a tree of processes in which at least two of the processes share at least a resource. The method continues with a step of restoring a checkpoint state of each resource used by the processes after a time when a possible need for a restoration state of the resource exists. According to an embodiment, the restoration state comprises information used by the method during the step of restoring the tree of processes. According to another embodiment, the restoration state comprises information used by the method during the step of restoring the checkpoint state of one or more particular resources. The method concludes with a step of resuming execution of each process after restoration of the checkpoint state of the resources used by the process.

23 Claims, 4 Drawing Sheets

METHOD OF RESTORING PROCESSES WITHIN PROCESS DOMAIN

RELATED APPLICATIONS

This application is related to U.S. application Ser. Nos. 10/837,110; 10/836,957; 10/837,410; and 10/837,420, filed on Apr. 30, 2004, the contents of which are hereby incorporated by reference.

FIELD OF THE INVENTION

The present invention relates to the field of computer processes. More particularly, the present invention relates to the field of computer processes where processes are checkpointed and later restarted.

BACKGROUND OF THE INVENTION

A computer in operation includes hardware, software, and data. The hardware typically includes a processor, memory, storage, and I/O (input/output) devices coupled together by a bus. The software typically includes an operating system and applications. The applications perform useful work on the data for a user or users. The operating system provides an interface between the applications and the hardware. The operating system performs two primary functions. First, it allocates resources to the applications. The resources include hardware resources—such as processor time, memory space, and I/O devices—and software resources including some software resources that enable the hardware resources to perform tasks. Second, it controls execution of the applications to ensure proper operation of the computer.

Often, the software is conceptually divided into a user level, where the applications reside and which the users access, and a kernel level, where the operating system resides and which is accessed by system calls. Within an operating computer, a unit of work is referred to as a process. A process is computer code and data in execution. The process may be actually executing or it may be ready to execute or it may be waiting for an event to occur. The system calls provide an interface between the processes and the operating system.

Checkpointing is a technique employed on some computers where processes take significant time to execute. By occasionally performing a checkpoint of processes and resources assigned to processes, the processes can be restarted at an intermediate computational state in an event of a system failure. Migration is a technique in which running processes are checkpointed and then restarted on another computer. Migration allows some processes on a heavily used computer to be moved to a lightly used computer. Checkpointing, restart, and migration have been implemented in a number of ways.

Operating system checkpoint, restart, and migration has been implemented as an integral part of several research operating systems. However, such research operating systems are undesirable because they lack an installed base and, consequently, few applications exist for them. Application level checkpoint, restart, and migration in conjunction with standard operating systems has also been implemented. But these techniques require that processes not use some common operating system services because the checkpointing only takes place at the application level.

Object based checkpoint, restart, and migration have also been implemented. Such object based approaches use particular programming languages or middleware toolkits. The object based approaches require that the applications be written in one of the particular programming languages or that the applications make explicit use of one of the middleware toolkits. A virtual machine monitor approach can be used to implement checkpoint, restart, and migration. But such an approach requires checkpointing and restarting all processes within the virtual machine monitor. This approach also exhibits poor performance due to isolation of the virtual machine monitor from an underlying operating system.

In *The Design and Implementation of Zap: A System for Migrating Computing Enviroments*, Proc. OSDI 2002, Osman et al. teach a technique of adding a loadable kernel module to a standard operating system to provide checkpoint, restart, and migration of processes implemented by existing applications. The loadable kernel model divides the application level into process domains and provides virtualization of resources within each process domain. Such virtualization of resources includes virtual process identifiers and virtualized network addresses. Processes within one process domain are prevented from interacting with processes in another process domain using inter-process communication techniques. Instead, processes within different process domains interact using network communications and shared files set up for communication between different computers.

Checkpointing in the technique taught by Osman et al. records the processes in a process domain as well as the state of the resources used by the processes. Because resources in the process domain are virtualized, restart or migration of a process domain includes restoring resource identifications to a virtualized identity that the resources had at the most recent checkpoint.

While the checkpoint, restart, and migration techniques taught by Osman et al. show promise, several areas could be improved. In particular, upon restart or migration of a process domain where some processes share resources, a conflict can occur between a process, which is using an intermediate state of a resource for restoration of the process, and another process, which overwrites the resource with a checkpoint state of the resource.

What is needed is a method of restoring processes within a process domain where at least some processes share at least some resources.

SUMMARY OF THE INVENTION

The present invention is a method of restoring processes within a process domain. An embodiment of the method begins with a step of restoring a tree of processes in which at least two of the processes share at least a resource. The method continues with a step of restoring a checkpoint state of each resource used by the processes after a time when a possible need for a restoration state of the resource exists. According to an embodiment, the restoration state comprises information used by the method during the step of restoring the tree of processes. According to another embodiment, the restoration state comprises information used by the method during the step of restoring the checkpoint state of one or more particular resources. The method concludes with a step of resuming execution of each process after restoration of the checkpoint state of the resources used by the process.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
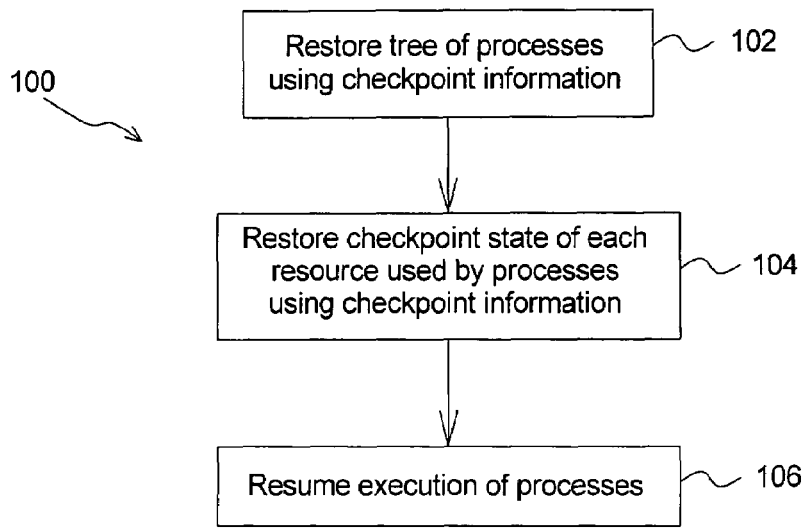
FIG. 1 illustrates an embodiment of a method of restoring a tree of processes within a process domain of the present invention as a flow chart.

An embodiment of a method of restoring a tree of processes within a process domain of the present invention is illustrated in FIG. 1 as a flow chart. The method 100 begins with a first step 102 of restoring the tree of processes using checkpoint information. This begins with creating a root process in the process domain. The root process then creates children processes of the root process. Each child of the root process then creates its own children processes until a skeleton of the tree of processes has been recreated. At this point, full restoration of the tree of processes is incomplete since each process uses resources which must be restored to a checkpoint state.

Figure 2:
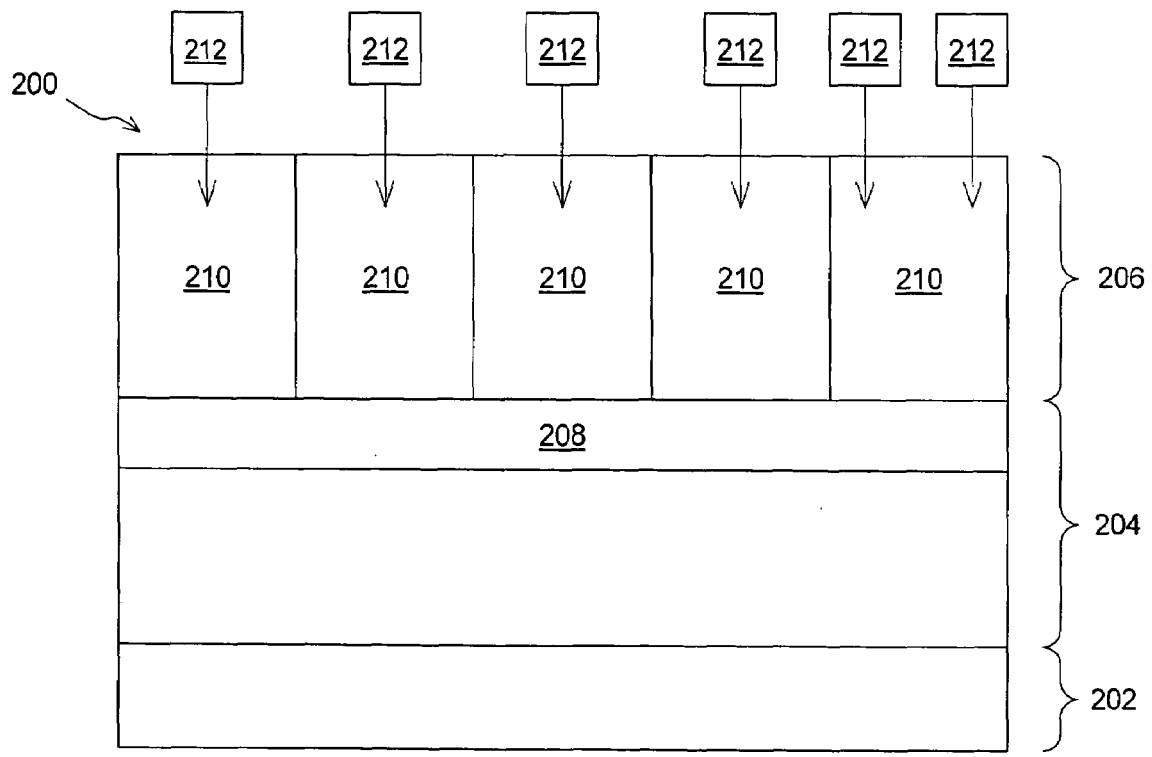
FIG. 2 schematically illustrates an embodiment of a computer system which implements a method of restoring a tree of processes of the present invention.

An embodiment of a computer system which implements the method of restoring the tree of processes is illustrated schematically in FIG. 2. The computer system 200 comprises computer hardware 202, an operating system kernel 204, and a user level 206. The operating system kernel 204 includes a process domain module 208, which divides the user level 206 into a plurality of process domains 210. As users 212 access and leave the computer systems 200, the process domain module 208 creates and terminates process domains 210 as needed.

Figure 3:
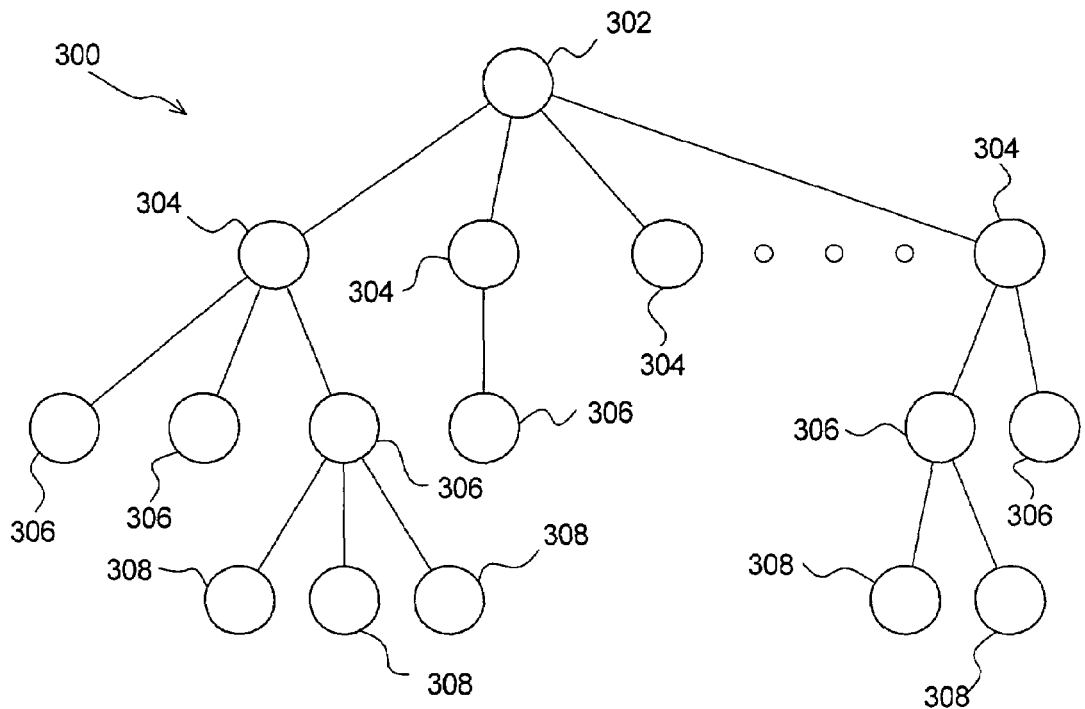
FIG. 3 schematically illustrates an embodiment of a tree of processes within a process domain, which is restored by a method of the present invention.

An embodiment of the tree of processes restored by the first step 102 (FIG. 1) is illustrated schematically in FIG. 3. Restoration of the tree of processes 300 begins with creating the root process 302. The root process 302 then creates the root process's children 304. Then each of the root process's children 304 create a next generation of children 306. This continues until the structure of the tree of processes 300 has been created. The tree of processes 300 that has been created exists in one of the process domains 210 of the computer system 200 (FIG. 2).

The tree of processes 300 includes at least two processes having a parent-child relationship in which the two processes share some resources. In some cases, a parent process and a child process may be what some refer to as "threads of a process." A thread is a sequential stream of execution within a process. Multiple threads of a process share code, data, and other operating system resources such as open files and signals. A traditional thread within a process shares the code, data, open files, and signals with the other threads within the process. Each thread does have some non-shared resources. These non-shared resources include registers and a stack for each thread. In the context of the present invention, some processes that share resources could be traditional threads. Other processes in the context of the present invention that share some resources might share less resources than those shared between traditional threads.

One skilled in the art will recognize that there is some disagreement over the meaning of the terms "threads" and "processes" to those skilled in the art. To some, "threads" are sequences of execution that share at least some resources while processes are sequences of execution which share no resources. To others, threads are sequences that share code, data, and files while processes can share some of theses resources. As used herein, a process could share its code, data, open files, signals, or any other operating system resource with its parent or a process could share some of these resources with its parent or a process might share no resources with its parent.

The method 100 (FIG. 1) continues in a second step 104 of restoring a checkpoint state of each resource used by the processes using the checkpoint information. Restoration of the checkpoint state of a particular resource comprises ensuring that a restoration state of the particular resource is no longer needed prior to restoration and ensuring that a single process restores the checkpoint state. According to an embodiment, the restoration state comprises information used by the method during the first step 102 of restoring the tree of processes. According to another embodiment, the restoration state comprises information used by the method during the second step 104 of restoring the checkpoint state of the resources. According to another embodiment, the restoration state comprises information used by the method during the first step 102 of restoring the tree of processes and information used by the method during the second step 104 of restoring the checkpoint state of the resources.

An embodiment of the method 100 accomplishes ensuring that a restoration state of a resource is no longer needed prior to restoration by having a parent process wait for children processes that share the resource with the parent process to inform the parent process that a need for the restoration state does not exist. According to an embodiment, the children processes accomplish this by sending a resource released message to the parent process after a possible need exists. For a specific resource shared between a parent process and a child process, the child process might need a restoration state of the specific resource or it might not need the restoration state. In other words, there is a possible need for the specific resource. By sending the resource release message after the possible need exists, it is ensured that the child process no longer needs the restoration state of the specific resource without having to determine whether there was actually a need for the restoration state.

An embodiment of the method 100 accomplishes ensuring that a single process restores the checkpoint state by restoring the checkpoint state of the particular resource by the process which does not share the particular resource with the parent of the process.

The method 100 concludes in a third step 106 of resuming execution of the processes. According to an embodiment, this is accomplished by a parent process sending proceed messages to its children processes after restoring the checkpoint state of the resources for which it is responsible and, with exception for the root process 302 (FIG. 3), after receiving a proceed message from the parent of the parent process.

Figure 4:
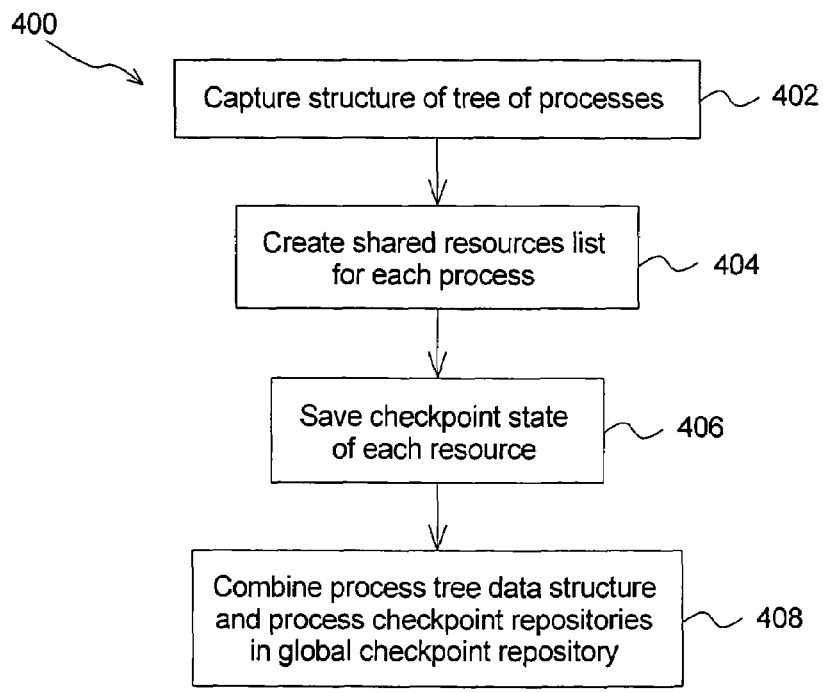
FIG. 4 illustrates an embodiment of a method of checkpointing a tree of processes of the present invention as a flow chart.

As the tree of processes 300 (FIG. 3) runs within a process domain 210 (FIG. 2), the process domain module 208 checkpoints the processes, 302 . . . 308, for later restart or migration. An embodiment of a method of checkpointing the processes of the present invention is illustrated in FIG. 4 as a flow chart. The method 400 begins with a first step 402 of capturing the structure of the tree of processes 300 including the processes, 302 . . . 308, and the parent-child relationships among the processes, 302 . . . 308. According to an embodiment, the first step 402 stores the structure of the tree of processes 300 in a process tree data structure. A second step 404 creates a shared resources list for each of the processes, 302 . . . 308, which shares at least one resource with its parent. A third step 406 saves a checkpoint state of each resource that a process does not share with its parent in a process checkpoint repository, which comprises a non-volatile storage medium. According to an embodiment, the process checkpoint repository comprises a file. According to another embodiment, the process checkpoint repository comprises a database.

According to an embodiment, the third step 406 forms a process checkpoint repository for each of the processes, 302 . . . 308. According to an embodiment, the method 400 concludes with the third step 406. According to another embodiment, the method 400 concludes with a fourth step 408 of combining the process tree data structure and the process checkpoint repositories for the processes, 302 . . . 308, in a global checkpoint repository. According to an embodiment, the global checkpoint repository comprises a file. According to another embodiment, the global checkpoint repository comprises a database.

Prior to performing the method 400 of checkpointing the processes, a situation may arise which needs to be addressed. If a process stops using a resource or if a process that is using a resource is killed, remaining processes that share the resource might not be part of a connected sub-tree of the tree of processes 300 (FIG. 3). In such a situation, additional information beyond parent-child information might be needed to synchronize restoration of the processes sharing the resource. This additional information can be obtained from the state of each resource and the list of resources owned by each process that is available during checkpoint.

According to an embodiment, if such a situation does arise, a method of checkpointing of the present invention assigns a pseudo parent to act as the parent for the remaining processes. For each resource, the method identifies a set of processes that share the resource. If the set of processes does not comprise a connected sub-tree of the tree of processes 300, one of the processes is selected to act as a pseudo parent and others of the set of processes act as pseudo children. Later, when the tree of processes 300 is restored according to a method of restoring the tree of processes of the present invention, the pseudo parent fulfills the role of parent for the purpose of restoring the resource, and each pseudo child fulfills the role of child for the purpose of restoring the resource.

According to another embodiment, if such a situation does arise, the method of restoring the tree of processes of the present invention assigns the pseudo parent to act as the parent for the remaining processes (i.e., the pseudo children).

Figure 5:
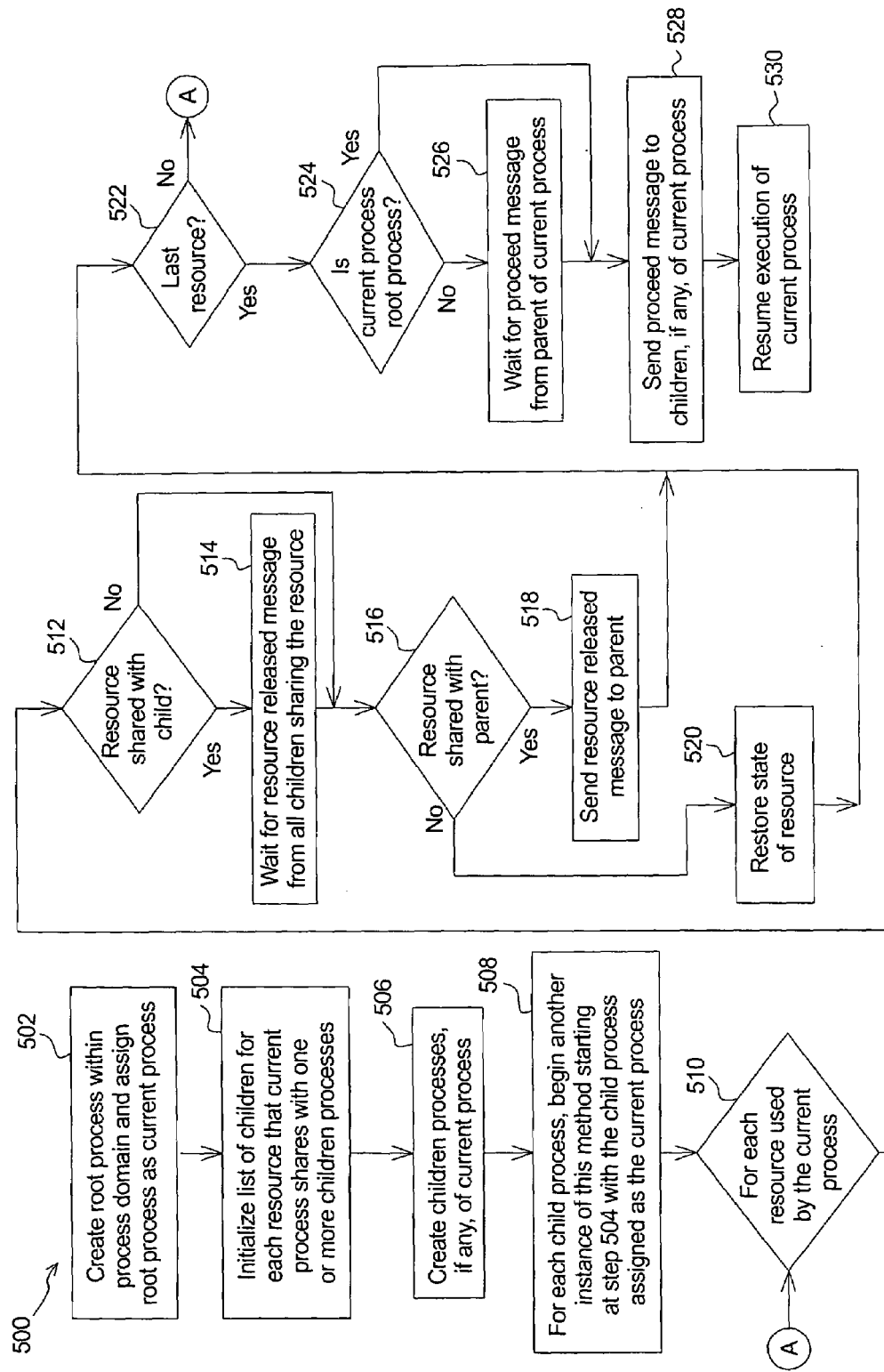
FIG. 5 illustrates an embodiment of a method of restoring a tree of processes within a process domain of the present invention as a flow chart.

Another embodiment of a method of restoring a tree of processes within a process domain of the present invention is illustrated in FIG. 5 as a flow chart. The method 500 begins in a first step 502 of creating a root process 302 (FIG. 3) of a process domain 210 (FIG. 2). At this point, the root process is a current process implementing the method 500. Later, additional instances of the method 500 will begin for descendant processes of the root process 302 with each descendant process implementing one of the additional instances of the method 500.

In a second step 504, the current process initializes a list of children for each resource that the current process shares with one or more of the children of the current process. Each list of children identifies the children that share a particular resource. For example, if a parent process shares three resources with at least some of its children, a first list of children identifies the children that share the first resource, a second list of children identify the children that share the second resource, and a third list of children identify the children that share the third resource. According to an embodiment, the lists of children which share the resources are determined from the shared resources lists formed in the second step 404 of the method 400 (FIG. 4) of checkpointing the processes, 302 . . . 308 (FIG. 3). In a third step 506, the current process creates the children of the current process. According to an embodiment, the current process creates the children of the current process using the process tree data structure stored in the first step 402 of the method 400 of checkpointing the processes, 302 . . . 308.

In a fourth step 508, each of the children of the current process begins the method 500 at the second step 504 as the current process. Thus, the structure of the tree of processes 300 (FIG. 3) is created by recursively creating a next generation of children and then having each child within the next generation implementing the method 500 beginning at the second step 504. For example, if the root process 302 has four children processes 304 and the children processes 304 have no children, at this point there will be five instances of the method 500. The root process 302 will be executing one of the instances of the method 500 and the children processes 304 will be executing the remaining instances of the method 500 with one and only one of the processes 304 executing one and only one of the instances.

In a fifth step 510, the current process begins a loop in which each resource used by the current process is considered. Each instance of the loop considers a resource used by the current process. The loop considers resources in a resource dependency order. The resource dependency order ensures that a particular resource is not restored until no other resource depends upon the particular resource's restoration state. In a sixth step 512, the current process determines whether the resource under consideration within this instance of the loop is shared with any children of the current process. According to an embodiment, the current process determines whether a list of children that shares the resource was initialized in the second step 504. If the list of children exists, the current process shares the resource with at least one child of the current process. If not, the current process does not share the resource with any children of the current process. If the current process shares the resource with any children of the current process, the current process proceeds to a seventh step 514. If not, the current process skips the seventh step 514 and proceeds to an eighth step 516.

In the seventh step 514, the current process waits for a resource released message from each child on the list of children for the resource. The resource released message indicates to the current process that a need, if any, of a restoration state for the resource no longer exists. According to a preferred embodiment, a child process of the current process sends the resource released message for each resource. This has the benefit of allowing resources to be restored as soon as possible. According to an alternative embodiment each child sends a single resource released message after a need, if any, for a restoration state of any shared resource no longer exists.

In an eighth step 516, the current process determines whether the resource is on the shared resources list of resources that the current process shares with its parent. If the resource is on the process's shared resource list, the current process sends a resource released message to the process's parent in a ninth step 518. If the resource is not on the process's shared resource list, the process restores the state of the resource in a tenth step 520. In an eleventh step 522, the current process determines whether any resources remain for consideration by the loop. If one or more resources remain, the current process returns to the fifth step 510. If not, the current process proceeds to a twelfth step 524.

From this point forward the current process operates at the kernel level since the current process is being transformed to the checkpointed process and, consequently, will be unable to accomplish the following steps at the user level. In the twelfth step 524, the current process determines whether the current process is the root process 302. If not, the current process waits in kernel mode for a proceed message from the process's parent in a thirteenth step 526. If the current process is the root process 302, the current process skips the thirteenth step 526. Upon receiving the proceed message or if the current process is the root process 302, the current process sends proceed messages to its children in a fourteenth step 528 and resumes execution in a fifteenth step 530.

Figure 6:
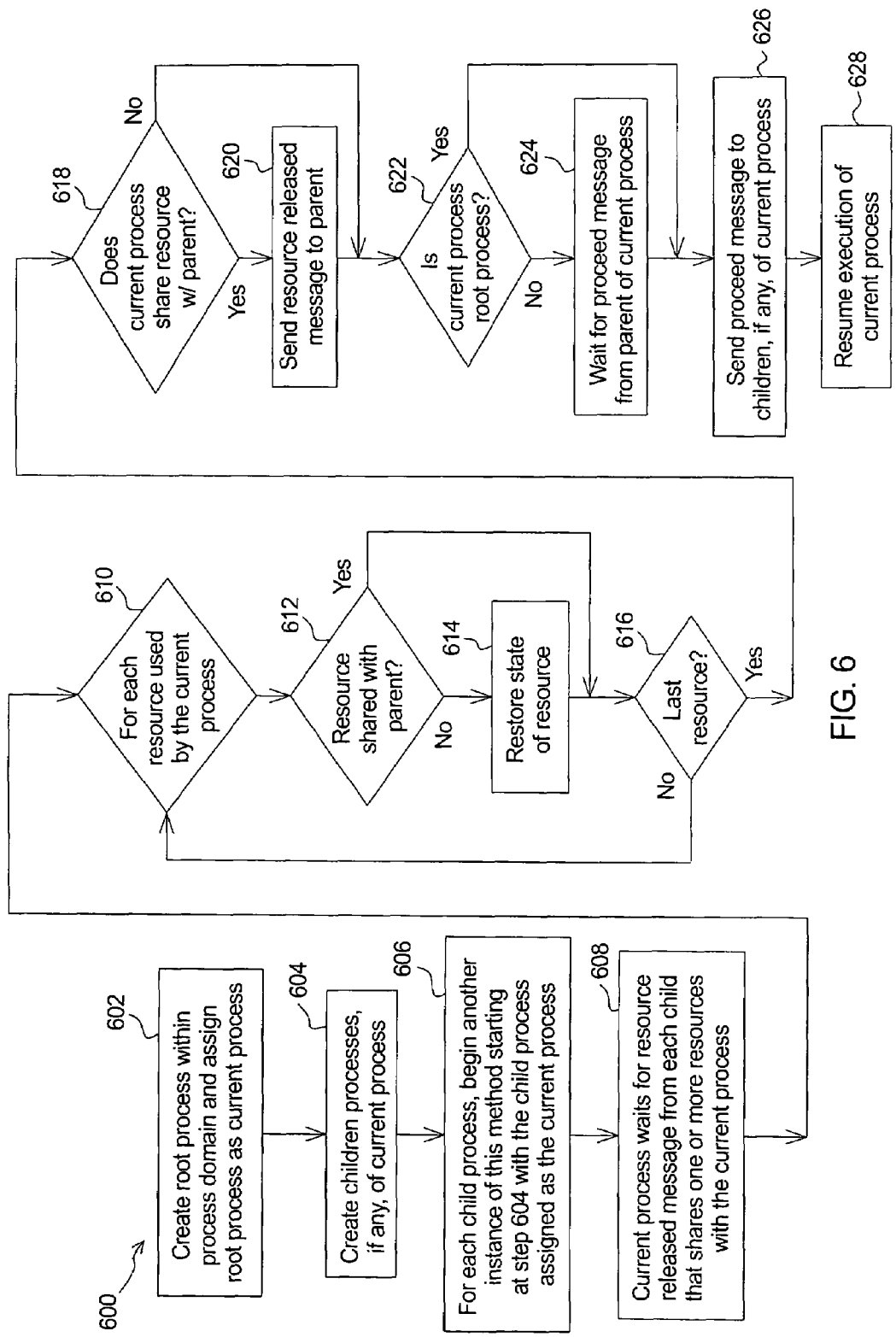
FIG. 6 illustrates another embodiment of a method of restoring a tree of processes within a process domain of the present invention as a flow chart.

Another embodiment of a method of restoring a tree of processes within a process domain of the present invention is illustrated in FIG. 6 as a flow chart. The method 600 begins in a first step 602 of creating a root process 302 (FIG. 3) of a process domain 210 (FIG. 2). At this point, the root process is a current process implementing the method 600. Later, additional instances of the method 600 will begin for descendant processes of the root process 302 with each descendant process implementing one of the additional instances of the method 600. In a second step 604, the current process creates the children of the current process.

In a third step 606, each of the children of the current process begins the method 600 at the second step 604 as the current process. In a fourth step 608, the current process waits for a resource released message from each child that shares one or more resources with the current process. In a fifth step 610, the current process begins a loop in which each resource used by the current process is considered. Each instance of the loop considers a resource used by the current process.

In a sixth step 612, the current process determines whether the resource is on the shared resources list of resources that the current process shares with its parent. If the resource is not on the process's shared resource list, the process restores the state of the resource in a seventh step 614. If the resource is on the process's shared resource list, the current process skips the seventh step 614. In an eighth step 616, the current process determines whether any resources remain for consideration by the loop. If one or more resources remain, the current process returns to the fifth step 610. If not, the current process proceeds to a ninth step 618.

In the ninth step 618, current process determines whether the current process shares any resources with the parent of the current process. If the current process does share one or more resources with the parent, the current process sends a resource released message to the parent in a tenth step 620. If the current process does not share any resources with the parent, the current process skips the tenth step 620. From this point forward the current process operates at the kernel level since the current process is being transformed to the checkpointed process and, consequently, will be unable to accomplish the following steps at the user level. In an eleventh step 622, the current process determines whether the current process is the root process 302. If not, the current process waits in kernel mode for a proceed message from the process's parent in a twelfth step 624. If the current process is the root process 302, the current process skips the twelfth step 624. Upon receiving the proceed message or if the current process is the root process 302, the current process sends proceed messages to its children in a thirteenth step 626 and resumes execution in a fourteenth step 628.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of restoring processes within a process domain comprising the steps of:
   restoring a tree of processes in which at least two of the processes share at least a resource;
   restoring a checkpoint state of each resource used by the processes after a time when each of the processes that share the resource have finished using the resource for said step of restoring; and
   resuming execution of each process after restoration of the checkpoint state of each resource used by the processes.

2. The method of claim 1 wherein the restoration state comprises information used during the step of restoring the tree of processes.

3. The method of claim 1 wherein the restoration state comprises information used during the step of restoring the checkpoint state of a particular resource.

4. The method of claim 1 wherein the restoration state comprises information used during the step of restoring the checkpoint state of particular resources.

5. The method of claim 1 wherein the step of restoring the tree of processes comprises restoring the root process and then recursively restoring a next generation of processes.

6. The method of claim 1 wherein the step of restoring the checkpoint state of each resource comprises:
   each process within the tree of processes restoring the checkpoint state of non-shared resources; and
   each process within the tree of processes restoring the checkpoint state of a resource not shared with a parent of the process but shared with at least one child of the process after receiving a resource released message from each child that shares the resource.

7. The method of claim 1 wherein the step of resuming execution of each process comprises each process informing each child of the process to resume the execution after restoration of the checkpoint state of any resource shared with the child.

8. The method of claim 1 wherein two processes having a parent-child relationship share code, data, open files, signal handlers, and other operating system resources.

9. The method of claim 1 further comprising the steps of checkpointing the tree of processes; and
   checkpointing the checkpoint state of each resource.

10. A method of restoring processes within a process domain comprising the steps of:
- restoring a tree of processes in which at least two of the processes share at least a resource;
- each process within the free of processes restoring a checkpoint state of non-shared resources;
- each process within the tree of processes restoring the checkpoint state of a resource not shared with a parent of the process but shared with at least one child of the process after receiving a resource released message from each child of the process that shares the resource;
- each process within the tree of processes sending the resource released message to the parent of the process after a time when a need for a restoration state of the resource could exist; and
- each process informing each child of the process to resume execution after restoration of the checkpoint state of any resource shared with the child.

11. The method of claim 10 wherein each process that shares the resource with the parent of the process sends a single resource released message to the parent.

12. The method of claim 10 wherein each process that shares at least two of the resources with the parent of the process sends a particular resource released message to the parent for each resource that the process shares with the parent.

13. The method of claim 10 wherein the restoration state comprises information used during the step of restoring the tree of processes.

14. The method of claim 10 wherein the restoration state comprises information used during the step of restoring the checkpoint state of a particular resource.

15. The method of claim 10 wherein the restoration state comprises information used during the step of restoring the checkpoint state of particular resources.

16. The method of claim 10 further comprising the steps of:
- checkpointing the tree of processes; and
- checkpointing the checkpoint state of each resource.

17. The method of claim 16 wherein the step of checkpointing the tree of processes comprises:
- saving a process tree data structure for the tree of processes;
- saving a process checkpoint for each process within the tree of processes; and
- saving a shared resources list for each process that shares at least a resource with the parent of the process.

18. The method of claim 17 wherein the process tree data structure comprises the processes within the process domain and parent-child relationships among the processes.

19. The method of claim 17 wherein the process checkpoint for each process comprises a state of the resources not shared with the parent of the process.

20. The method of claim 10 wherein the free of processes comprises a root process and other processes.

21. The method of claim 10 wherein two processes having a parent-child relationship share code, data, open files, signal handlers, and other operating system resources.

22. A computer readable medium having computer readable program code stored thereon, which when executed performs a method of restoring processes within a process domain, comprising the steps of:
- restoring a tree of processes in which at least two of the processes share at least a resource;
- restoring a checkpoint state of each resource used by the processes after a time when each of the processes that share the resource have finished using the resource for said step of restoring; and
- resuming execution of each process after restoration of the checkpoint state of each resource used by the processes.

23. A computer readable medium having computer readable program code stored thereon, which when executed performs a method of restoring processes within a process domain comprising the steps of:
- restoring a tree of processes;
- each process within the tree of processes restoring a checkpoint state of non-shared resources;
- each process within the tree of processes restoring the checkpoint state of a resource not shared with a parent of the process but shared with at least one child of the process after receiving a resource released message from each child of the process that shares the resource;
- each process within the tree of processes sending the resource released message to the parent of the process after a time when a need for a restoration state of the resource could exist; and
- each process informing each child of the process to resume execution after restoration of the checkpoint state of any resource shared with the child.

* * * * *

UNITED STATES PATENT AND TRADEMARK OFFICE
CERTIFICATE OF CORRECTION

PATENT NO. : 7,275,183 B2 Page 1 of 1
APPLICATION NO. : 10/836538
DATED : September 25, 2007
INVENTOR(S) : Jose Renato Santos et al.

It is certified that error appears in the above-identified patent and that said Letters Patent is hereby corrected as shown below:

In column 9, line 5, in Claim 10, delete "free" and insert -- tree --, therefor.

In column 10, line 7, in Claim 20, delete "free" and insert -- tree --, therefor.

In column 10, line 15, in Claim 22, delete "domain," and insert -- domain --, therefor.

Signed and Sealed this

Twenty-ninth Day of July, 2008

JON W. DUDAS
*Director of the United States Patent and Trademark Office*